United States Patent
Lei et al.

(10) Patent No.: US 12,307,872 B2
(45) Date of Patent: May 20, 2025

(54) EMERGENCY ALERTS VIA PARKED VEHICLES

(71) Applicant: FORD GLOBAL TECHNOLOGIES, LLC, Dearborn, MI (US)

(72) Inventors: Oliver Lei, Windsor (CA); Joshua R. Wheeler, Trenton, MI (US); Matt Jones, Beaverton, OR (US); Nicholas Colella, Grosse Ile, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 80 days.

(21) Appl. No.: 18/225,214

(22) Filed: Jul. 24, 2023

(65) Prior Publication Data

US 2025/0037564 A1 Jan. 30, 2025

(51) Int. Cl.
*G08G 1/09* (2006.01)
*B60Q 9/00* (2006.01)
*G08B 21/10* (2006.01)
*H04H 20/59* (2008.01)

(52) U.S. Cl.
CPC ............... *G08B 21/10* (2013.01); *B60Q 9/00* (2013.01); *H04H 20/59* (2013.01)

(58) Field of Classification Search
USPC ........ 340/901, 905, 902–904, 921–922, 925, 340/929, 935, 989, 426.12–426.13, 340/426.16–426.18, 435, 515
See application file for complete search history.

(56) References Cited

U.S. PATENT DOCUMENTS

| | | | | |
|---|---|---|---|---|
| 8,768,292 | B2 * | 7/2014 | Welch | B60N 2/0022 455/521 |
| 2008/0177994 | A1 * | 7/2008 | Mayer | G06F 16/00 709/224 |
| 2009/0312901 | A1 * | 12/2009 | Miller | B60R 25/045 701/36 |
| 2016/0012445 | A1 * | 1/2016 | Villa-Real | G06Q 20/4016 705/44 |
| 2018/0165945 | A1 * | 6/2018 | McClendon | G01S 19/17 |
| 2020/0175786 | A1 * | 6/2020 | Bongers | G06Q 10/0635 |
| 2022/0234604 | A1 * | 7/2022 | Feldkamp | B60W 50/14 |

FOREIGN PATENT DOCUMENTS

WO 2016044075 A1 3/2016

* cited by examiner

*Primary Examiner* — Daniel Previl
(74) *Attorney, Agent, or Firm* — Frank L. Lollo; MacMillan, Sobanski & Todd, LLC

(57) ABSTRACT

A vehicle includes a radio receiver configured to receive emergency alert messages initiated by an alerting authority and broadcast by an alerting disseminator. The radio receiver is normally inactive when the vehicle is in the dormant state. A user monitor is configured to track a user during a time that the vehicle is in the dormant state to detect whether the user remains in the vehicle or is within a predetermined distance of the vehicle. A controller coupled to the radio receiver and to the user monitor is configured to activate the radio receiver during the dormant state when the user is present. The controller detects the existence of a relevant emergency alert message and initiates an annunciation signal which is generated by the vehicle and perceptible to the user to inform the user that the relevant emergency alert message is available.

20 Claims, 4 Drawing Sheets

EMERGENCY ALERTS VIA PARKED VEHICLES

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to reception on an automotive vehicle of broadcasts containing emergency alert messages, and, more specifically, to disseminating emergency messages to a user when the vehicle is turned off.

Emergency warning systems have been deployed by governmental agencies and other groups to disseminate urgent messages as widely as possible when emergency conditions have occurred or may occur. In the United States, for example, the Emergency Alert System (EAS) enables authorities to broadcast alerts via television (over the air, cable, and satellite) and radio (AM, FM, and satellite) broadcasts. During vehicle travel, the reception and reproduction of alerts via radio broadcasts is a primary mechanism for reaching the users (e.g., driver and occupants) of the vehicle. Many vehicular receivers are configured to detect the alert signals that may be broadcast via different stations or in different channels simultaneously. A receiver which is reproducing media content of one channel may monitor broadcasts on other channels for alerts in the background, and it may monitor predetermined broadcasts for alerting signals even when the receiver is not actively reproducing any channels. In some areas, the Radio Data System (RDS) or a similar system may be used to embed emergency messages into a broadcast or to provide a notice for a receiver to automatically re-tune to a broadcast which is sending out an alert.

Activation of an automotive vehicle depends on use of a "key" which proves that a user has authorization to access the vehicle. The "key" may be a physical key insertable into an ignition lock or may be a wireless device such as a key fob which may operate in conjunction with a physical pushbutton, for example. Furthermore, the key/lock combination or the pushbutton may be used to select between different vehicle power states including an OFF or dormant state, an Accessory (ACC) state, and an ON state. In the ON state, any electrical loads may be available. In the ACC state, a subset of the electrical loads may be available. The ON state and ACC state are collectively referred to herein as an active state. In the dormant (OFF) state, most electrical loads may be unavailable to the user.

A typical automotive electrical system relies on a storage battery to power electrical system loads during times when a main electrical power source (e.g., gasoline-driven alternator) is inactive/inaccessible. The storage battery has a finite charge capacity, and it is important to maintain sufficient energy storage to start up the vehicle (e.g., start the gasoline engine or close the high voltage contactors in an electric vehicle). Therefore, the vehicle manufacturer usually specifies limits for the current drawn by various modules under each of the conditions which may arise. In the dormant state, an audio entertainment system including any radio receivers (AM, FM, or satellite) is typically placed in a sleep mode or is depowered, and no emergency alerts can be provided in real time.

SUMMARY OF THE INVENTION

A vehicle user may sometimes drive the vehicle to go to a park or other venue for camping, picnicking, and other activities. With the vehicle being parked nearby, the user may even leave open a vehicle door, trunk, or liftgate (i.e., tailgate) for access to vehicle contents. A user may stay in the vehicle with the ignition OFF in order to relax or to wait for the arrival of another person or event. If there is an emergency alert on going with the ignition OFF, the user would not have been notified immediately in the prior art. The present invention monitors 1) whether a user stays in the vehicle after turning the ignition off, 2) whether a user stays in close proximity to the vehicle, and/or 3) whether a vehicle door, trunk, or liftgate is open. If the user is nearby, or the user remains in the vehicle, or the door/trunk/liftgate is open, then a vehicle's broadcast receiver monitors for alerts (e.g., by keeping at least a portion of a satellite receiver turned on in order to monitor a preview channel or other emergency channel). If an alert is received, then the vehicle notifies the user via honking of a horn, flashing of exterior lights, and/or reproducing an alert message inside the vehicle (e.g., displaying the alert on a display screen and/or playing an audio message over the vehicle speakers).

In one aspect of the invention, a vehicle having an active state and a dormant state comprises a radio receiver configured to receive emergency alert messages initiated by an alerting authority and broadcast by an alerting disseminator. The radio receiver is normally inactive when the vehicle is in the dormant state. A user monitor is configured to track a user during a time that the vehicle is in the dormant state to detect whether the user remains in the vehicle or is within a predetermined distance of the vehicle. A controller coupled to the radio receiver and to the user monitor is configured to activate the radio receiver during the dormant state when the user remains in the vehicle or is within a predetermined distance of the vehicle. The controller detects the existence of a relevant emergency alert message and initiates an annunciation signal which is generated by the vehicle and perceptible to the user to inform the user that the relevant emergency alert message is available.

DETAILED DESCRIPTION OF PREFERRED EMBODIMENTS

The present invention activates a radio receiver (e.g., AM, FM, satellite digital audio broadcasts, or other wireless services) to monitor for emergency alerts in one or more different scenarios when the vehicle ignition (i.e., power state) is OFF, including 1) detecting that a user remains in the vehicle, 2) detecting that a vehicle body closure (e.g., door, trunk, liftgate) has been left open, or 3) detecting that a user remains within a proximity of the vehicle. The user may be tracked inside or outside of the vehicle based on vehicle sensors (e.g., seat sensors, cameras, ultrasonic sensors, or radar units) of based on the existence of a wireless network connection between the vehicle and a mobile device carried by the user (e.g., a smartphone with a Bluetooth connection). During these conditions, a vehicle controller keeps at least one broadcast receiver (e.g., a satellite receiver such as a Sirius XM receiver or an FM receiver) at least partially active and powered in order to monitor the broadcasts for an alert (e.g., a signal from a primary entry point (PEP) of the Emergency Alert System). Whenever an emergency alert is delivered via the Sirius XM or the FM receiver, the controller initiates an annunciation signal to inform the user that an emergency message has been received. For example, the vehicle controller may trigger the vehicle to honk the horn and/or flash interior or exterior lights. It may also turn on the full audio system to reproduce an audio message and/or display the message on a display screen (when the user stayed in the vehicle or when a user returns to the vehicle in response to the annunciation signal). When there is a wireless network connection, then the annunciation signal and/or the emergency message can be sent wirelessly to the user's mobile device.

Figure 1:
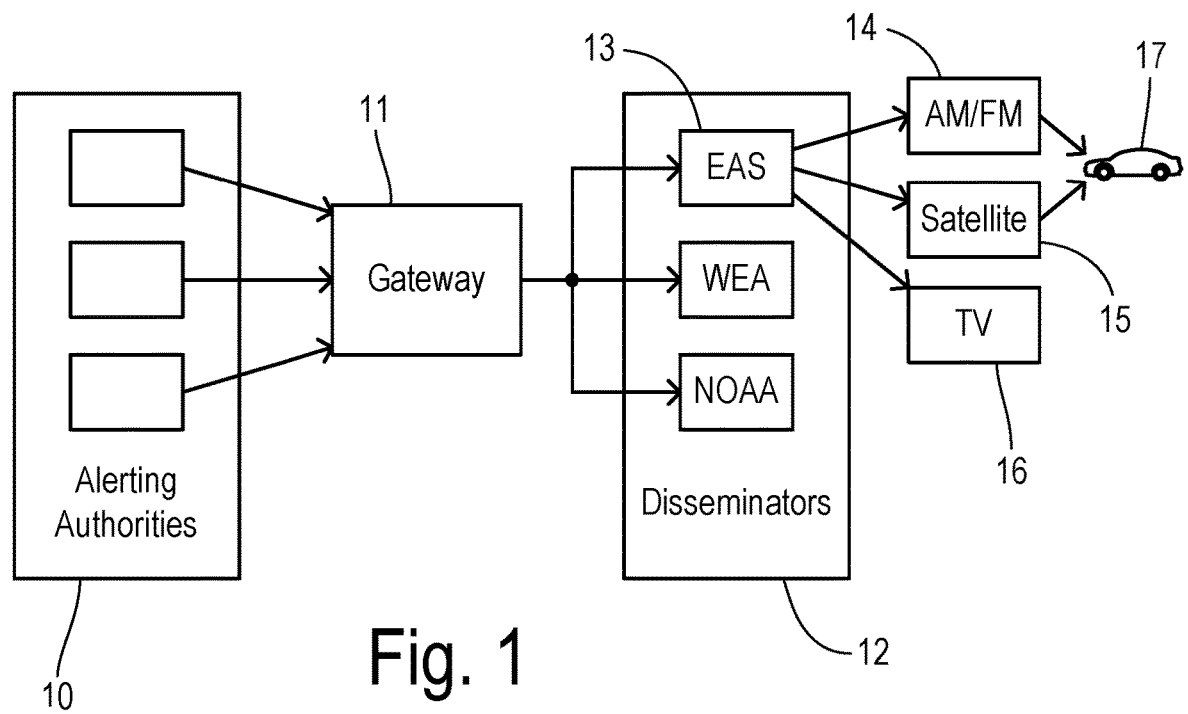
FIG. 1 is a block diagram showing portions of an emergency alerting system.

Referring to FIG. 1, a general architecture of an alerting system includes a group of alerting authorities 10 which may include local, state, national, and other agencies that utilize a Common Alerting Protocol (CAP) to send emergency messages via a gateway 11 to message disseminators 12. Examples of alerting authorities 10 include a national weather service, a federal emergency management agency, a volcano hazards program, and others. Message disseminators includes an Emergency Alert System (EAS) 13 together with a Wireless Emergency Alert (WEA) cellular system and a National Oceanic and Atmospheric Administration (NOAA) communication infrastructure. EAS 13 includes terrestrial AM and FM transmitters 14, satellite digital audio broadcasting (DAB) transmitter 15, and television/cable networks 16. An automotive vehicle 17 receives radio signals from transmitters 14 and/or 15 including any emergency alerts which are accordingly decoded and reproduced for the vehicle occupants.

Figure 2:
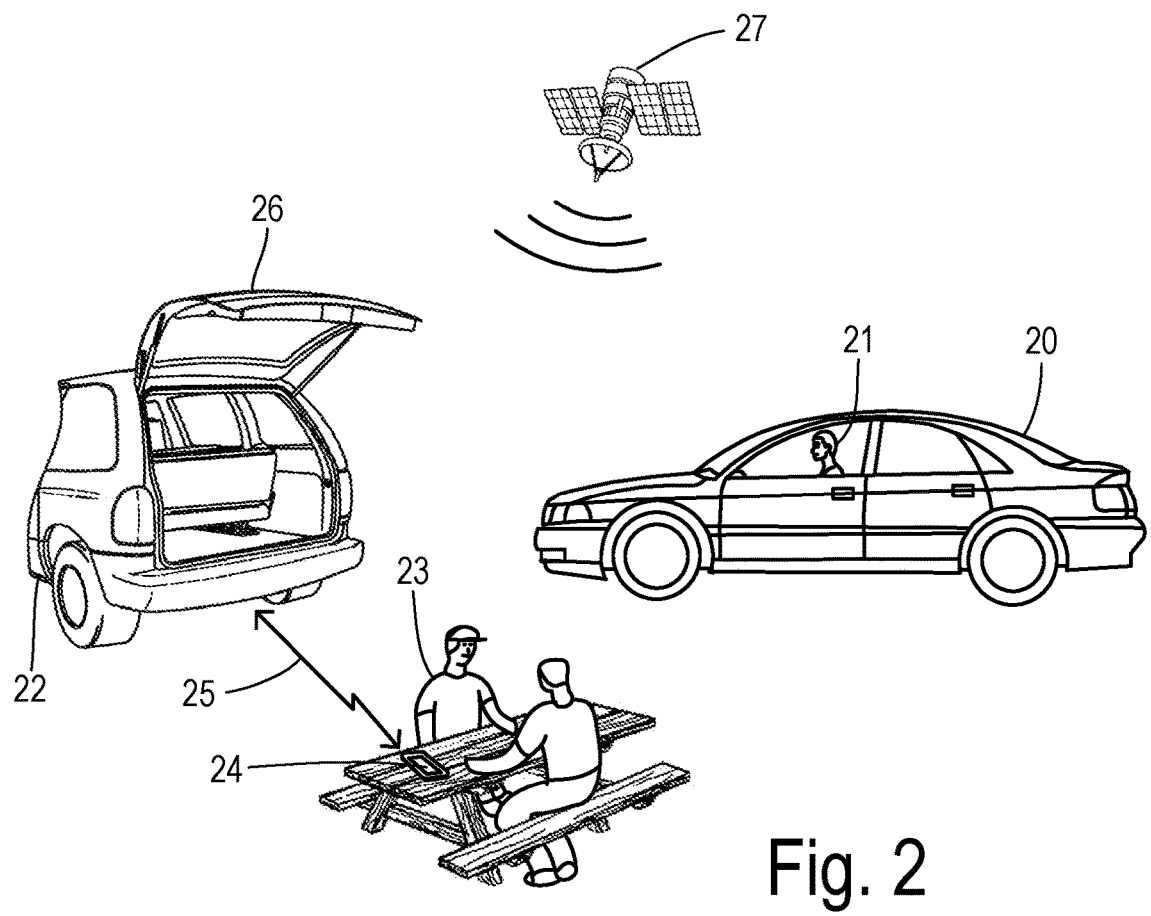
FIG. 2 is a schematic diagram showing scenarios in which a user has a vehicle in a dormant state while the user is available and could be notified of emergency alert messages.

As shown in FIG. 2, a vehicle 20 may be parked and turned off (i.e., put into a dormant state) by a user 21 who remains inside the dormant vehicle to rest or to await for some later time or event. A different scenario may occur when a user 23 of another vehicle 22 is lingering outside but remaining in close proximity to a parked and dormant vehicle 22, such as when spending time in a park or other recreational site for picnicking or other activities. User 23 may carry a mobile device 24 such as a smartphone which may have a wireless network connection 25 with dormant vehicle 22, thereby indicating to vehicle 22 that user 23 is within a distance corresponding to the range of the wireless network.

The invention would typically not include a scenario in which vehicle 22 is dormant and parked at an ordinary location for user 23 such as a home or workplace, since when at such an ordinary location other sources of emergency alerts would be available for user 23 and because the amount of time spent a predetermined ordinary location would result in excessive battery usage from long term operation of the radio receiver.

Vehicle 22 has body closures including a liftgate 26 which may be left open for an extended period of time while user 23 lingers in proximity to vehicle 22 (e.g., to access food or beverages). Detection of the open state of the body closure can be utilized as an indication that user 23 remains within a predetermined distance (e.g., is close enough to keep an eye on the open vehicle and is therefore close enough to perceive audio cues such as a honking horn or visual cues such as a flashing vehicle light). An open body closure may also initiate monitoring for emergency alerts even when vehicle 22 is at an ordinary location of user 23 since it would be an unusual situation.

In the scenarios illustrated in FIG. 2, satellite radio receivers in vehicles 20 and 22 continue to operate even though the vehicles are in a dormant state. Emergency alert messages broadcast by a satellite 27 are thus detected in vehicles 20 and 22 and can be brought to the attention of users 22 and 23.

Figure 3:
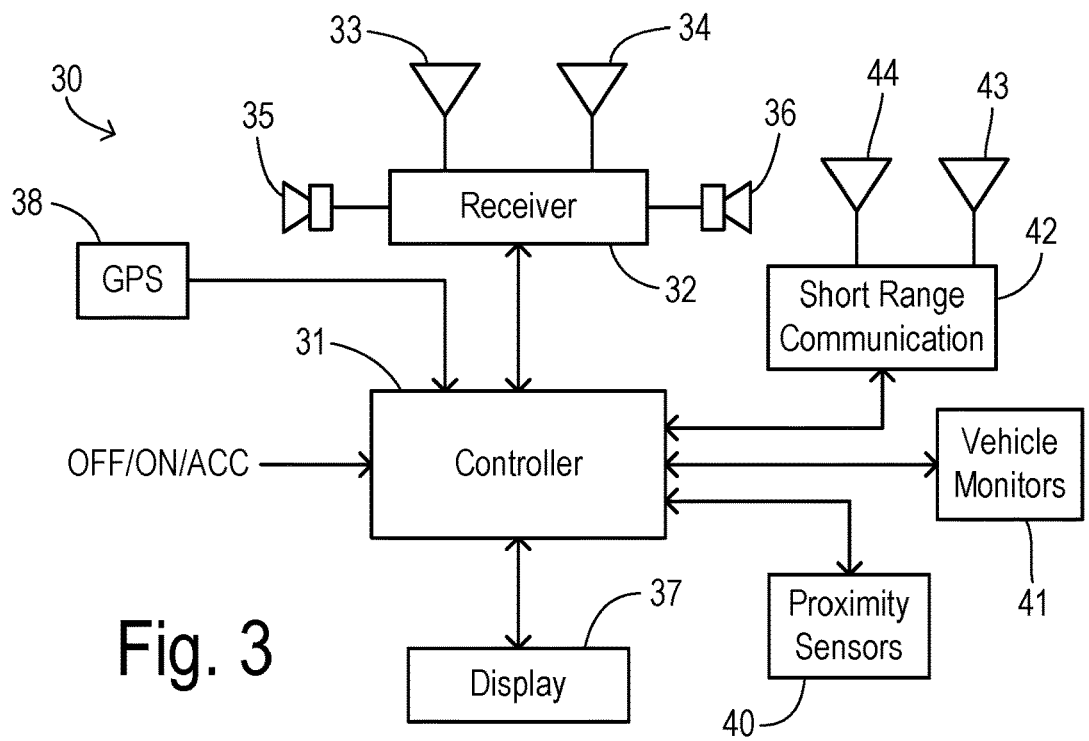
FIG. 3 is a block diagram of a vehicle according to an embodiment of the invention.

FIG. 3 shows a vehicle 30 in greater detail. A controller 31 (e.g., an electronic module having a microcontroller configured to operate within a controller network of vehicle 30) receives signals over a multiplex bus (not shown) identifying a current ignition state of vehicle 30. The ignition state may be OFF, ON, or ACC. Controller 31 is coupled with a radio receiver 32 such that controller 31 is able to activate or deactivate operation of radio receiver 32 even when the current ignition state is OFF. Receiver 32 has antennas 33 and 34 configured for receiving satellite and terrestrial FM signals, for example. Reproduced audio may be played via loudspeakers 35 and 36.

Controller 31 is further coupled with a display panel 37 which can be used to show text or other information associated with emergency alert messages. Such messages may be decoded within receiver 32 and formatted by controller 31 for appropriate display.

Controller 31 is coupled to a global positioning system GPS 38 which determines geographic coordinates for the location of the vehicle. The vehicle location enables controller 31 to select emergency alert messages that may be relevant to the user of the vehicle.

Controller 31 is further coupled with proximity sensors 40 which may include external cameras, radar, and lidar units. Proximity sensors 40 monitor the exterior environment in order to identify and track a user of the vehicle. For example, movement of a person may be continuously tracked once they exit vehicle 30 and during a time that they remain in close proximity to the vehicle. Alternatively, facial recognition can be used to recognize a pre-stored identity of a user.

Controller 31 is coupled to vehicle monitors 41 which may include a seat sensor or an interior camera for monitoring occupants of the vehicle especially when the ignition state is OFF.

Tracking of a user to determine whether they are within a predetermined distance of the vehicle can alternatively be accomplished by controller 31 using a wireless connection between a short range communication transceiver 42 and a wireless device carried by the user. Short range communication may include a network connection via a Bluetooth antenna 43 or a Wi-Fi antenna 44, for example. The wireless mobile device may include a smartphone and an app executing on the smartphone for conducting network communication via communication transceiver 42, thereby enabling controller 31 to transmit an annunciation signal when an emergency alert message has been received via radio receiver 32 or to transmit actual contents of an emergency alert message.

Figure 4:
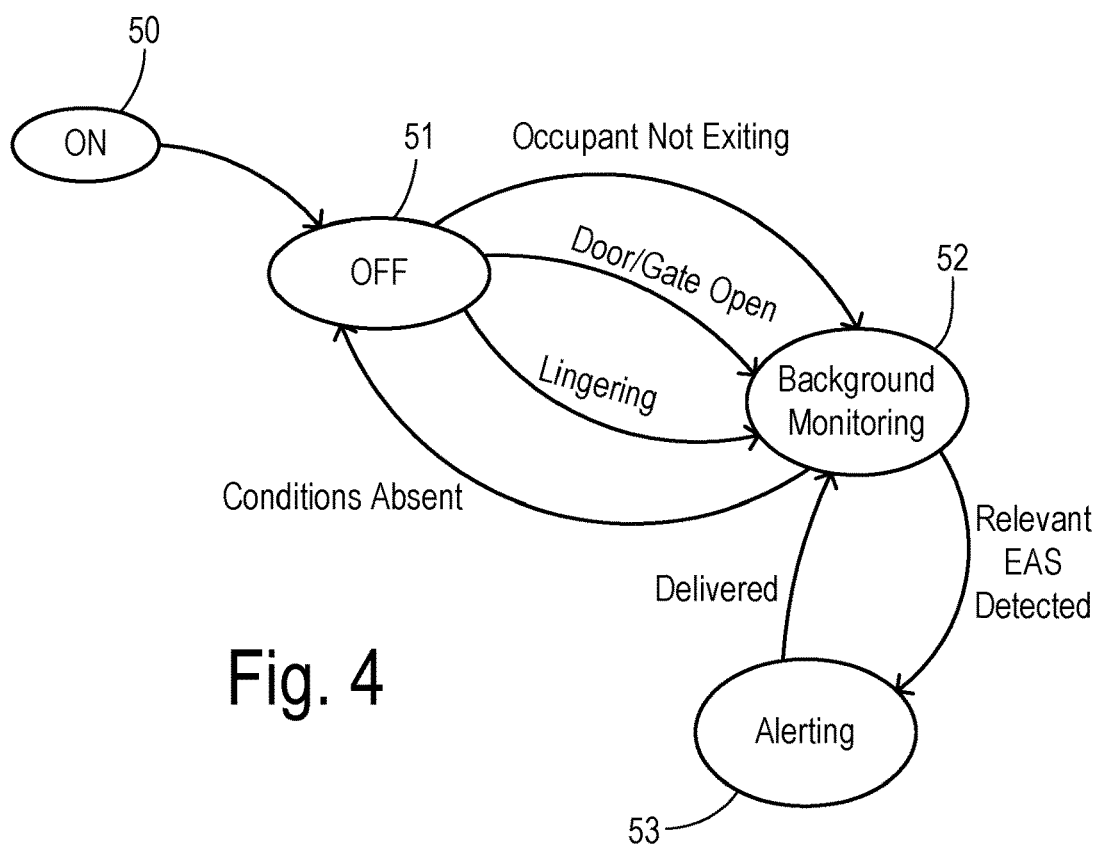
FIG. 4 is a state diagram showing an operating process of the invention.

FIG. 4 shows a state diagram wherein a vehicle initially in an ON state 50 transitions to an OFF state 51 in response to turning an ignition key to an OFF position or pressing a "start" button in the vehicle. In particular, the controller may receive an ignition signal designating an OFF mode to enter the dormant state. User monitoring is conducted in OFF state 51 to detect user activity during a time that the vehicle is in the dormant state. The monitored user activity may involve the user remaining in the vehicle or lingering within a predetermined distance of the vehicle. In one use case, user monitoring determines that the user continues to occupy a seat in the vehicle. In particular, it may be detected that the user continues to occupy the seat after a predetermined length of time which is indicative that the user is not exiting the vehicle. When the user is not exiting, then a transition is made to a background monitoring state 52 in which the radio receiver is at least partially activated in order to receive and act upon emergency alert messages. In another use case, monitoring includes detecting an open state of a vehicle body closure. In particular, a transition may be made to background monitoring state 52 when the vehicle body closure remains open for greater than a predetermined period of time (e.g., a liftgate remains open for several minutes). In another use case, the user monitoring tracks the user while lingering outside the vehicle within a predetermined distance. The predetermined distance may correspond to either an effective maximum distance of a wireless network connection or a maximum line-of-sight, physical separation distance (as determined by a user monitor) such that the honking of a horn or the flashing of vehicle lights is likely to be perceptible by the user in order to annunciate the incidence of an emergency alert message.

In background monitoring state 52, emergency alert messages that occur within received broadcasts (e.g., within a satellite broadcast signal or terrestrial broadcast signal) may be checked for relevancy to the user. Relevancy may be based on a coincidence of the user's location with the geographic area to which the emergency alert message is directed. When a relevant emergency alert message is detected, a transition is made to an alerting state 53. Alerting state 53 may preferably include generating an annunciation signal comprised of honking of a vehicle horn or other audio noises, flashing of vehicle lights, or transmission of a wireless signal via a short range network communication signal. Once the annunciation signal is provided to the user, alerting state 53 may further include monitoring for a return of the user into the interior of vehicle so that full details of the emergency alert message can be communicated by turning on the radio receiver speakers and/or displaying a message on a display panel. Once the emergency alert message is delivered, a return is made to background monitoring state 52. Whenever none of the use cases are valid for performing the background monitoring then a transition is made back to OFF state 51.

Figure 5:
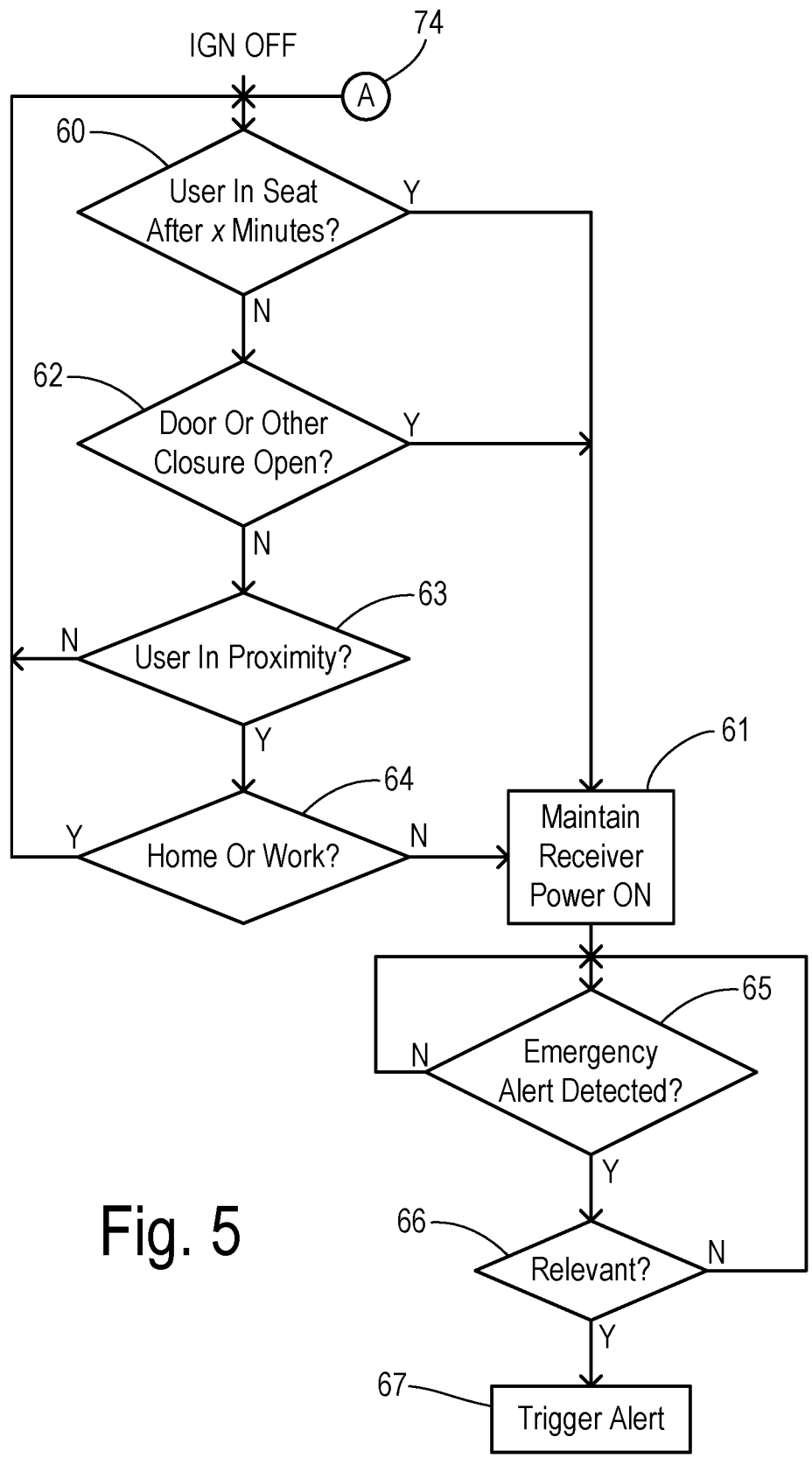
FIG. 5 is a flowchart showing an embodiment of a method for triggering an alert with the vehicle in a dormant state.

FIG. 5 shows a method of the invention wherein the ignition state corresponds to the dormant state. In step 50, a check is performed to determine whether the user continues to remain in the vehicle seat after a predetermined time. If so then the receiver power is maintained ON in step 61. If the user has not remained in the seat, then a check is performed in step 62 to determine whether a vehicle door or other vehicle body closure has been left open for greater than a predetermined amount of time. If so then receiver power is maintained in step 61. Otherwise, a check is performed in step 63 to determine whether the user remains within a predetermined distance of the vehicle. If not then a return is made to step 60 in order to continuously monitor for each of the use cases. If the user remains in proximity, then a check is performed in step 64 to determine whether the vehicle location corresponds to an ordinary location of the vehicle (e.g., at home or at work). If so then a return is made to step 60, but if not located at an ordinary location then receiver power is maintained on in step 61.

With the radio receiver powered on and continuously monitoring for emergency alert messages, a check is performed in step 65 to determine whether an emergency alert has been detected. If so, then a relevancy of the message is checked in step 66. If not relevant then monitoring continues in step 65. When the emergency alert message that is received is found to be relevant, than an alert is triggered in step 67 in order to inform the user of the existence of an emergency alert message.

Figure 6:
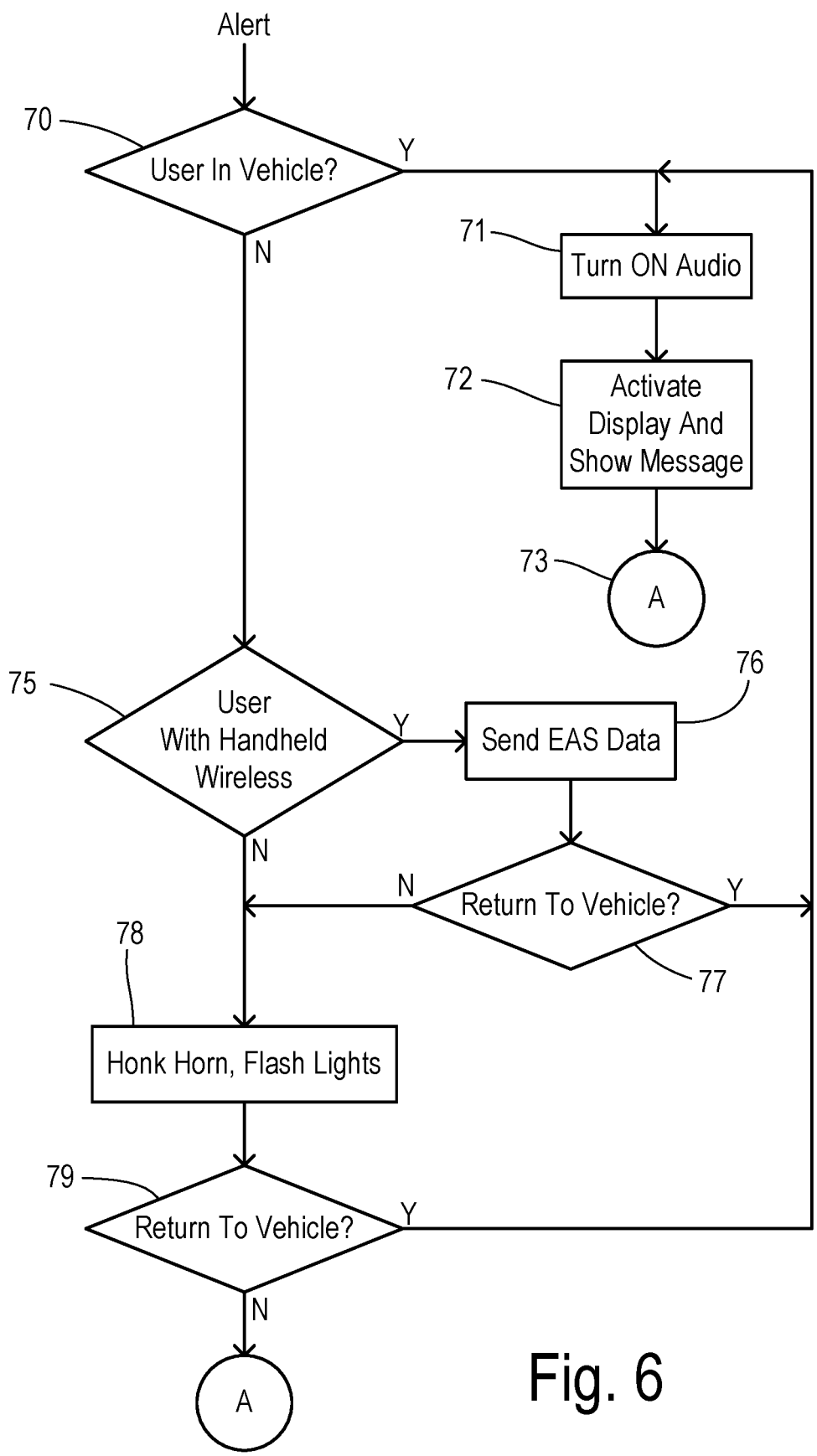
FIG. 6 is a flowchart showing an embodiment of a method for delivering an annunciation signal to the user.

FIG. 6 shows the alerting process of step 67 in greater detail. In response to the alert, a check is performed in step 70 to determine whether the user is in the vehicle. If in the vehicle, then the audio output of the radio receiver is turned on in step 71 and the emergency alert message is reproduced. In addition, a display panel is activated to show the message in step 72. Once the alert message has been delivered to the user, a return is made via Point A at step 73 to the beginning of the flowchart in FIG. 5.

If the user is not in the vehicle, then a check is performed in step 75 to determine whether the user is connected to the vehicle via a network link to a handheld wireless device. If so, then an advisory message containing data relating to the emergency alert message is sent via the wireless network in step 76. A check is performed in step 77 to determine whether the user has returned to the vehicle and if so then a return is made to step 71 in order to reproduce the alert inside the vehicle. If the user has not returned, then the horn of the vehicle is honked to provide an acoustic alert and the vehicle lights are flashed to provide a visible alert in step 78. If the user does not have a handheld wireless network connection, then step 78 is performed immediately after step 75. A check is performed in step 79 to determine whether the user returns to the vehicle and if so then the full message can be replayed and displayed by returning to step 71. Otherwise, once the annunciation signal has been made by honking a horn or flashing a light source then a return is made via Point A to the beginning of the flowchart in FIG. 5.

What is claimed is:

1. A vehicle having an active state and a dormant state, the vehicle comprising:
   a radio receiver configured to receive emergency alert messages initiated by an alerting authority and broadcast by an alerting disseminator, wherein the radio receiver is normally inactive and unable to receive the emergency alert messages when the vehicle is in the dormant state, wherein the dormant state excludes an Accessory state and an ON state of the vehicle;
   a user monitor configured to track a user during a time that the vehicle is in the dormant state to detect whether the user remains in the vehicle or is within a predetermined distance of the vehicle; and
   a controller coupled to the radio receiver and to the user monitor, wherein the controller is configured to activate the radio receiver during the dormant state when the user remains in the vehicle or is within a predetermined distance of the vehicle, wherein the controller is further configured to detect existence of a relevant emergency alert message and to initiate an annunciation signal generated in the vehicle and perceptible to the user to inform the user that the relevant emergency alert message is available.

2. The vehicle of claim 1 wherein the user monitor is configured to detect that the user occupies a seat in the vehicle.

3. The vehicle of claim 1 wherein the user monitor is configured to detect a location of the vehicle while tracking the user outside the vehicle, and wherein the controller activates the radio receiver when the vehicle location does not correspond to a predetermined ordinary location of the vehicle.

4. The vehicle of claim 3 wherein the predetermined ordinary location comprised a home location or a work location.

5. The vehicle of claim 1 further comprising:
a vehicle monitor configured to detect an open state of a vehicle body closure;
wherein the controller activates the radio receiver during the dormant state when the open state is detected.

6. The vehicle of claim 1 further comprising:
a wireless transceiver configured to communicate with a handheld wireless device of the user;
wherein the annunciation signal is comprised of an advisory message transmitted from the wireless transceiver to the handheld wireless device.

7. The vehicle of claim 6 wherein the wireless transceiver utilizes short-range network communication, and wherein the user monitor is comprised of a detection of a network link between the wireless transceiver and the handheld wireless device.

8. The vehicle of claim 1 further comprising:
a horn coupled to the controller; and
an exterior light coupled to the controller;
wherein the annunciation signal is comprised of an acoustic alert from the horn and a visible alert from the exterior light.

9. The vehicle of claim 1 further comprising:
a display panel coupled to the controller and to the radio receiver;
wherein the controller detects a return of the user in response to the annunciation signal, and wherein the controller activates the display panel to display information from the relevant emergency alert message when the return is detected.

10. The vehicle of claim 1 wherein the controller is configured to receive an ignition signal designating an OFF mode to enter the dormant state.

11. A method of interacting with a user of a vehicle, wherein the vehicle has an active state and a dormant state, wherein the vehicle has a radio receiver configured to receive emergency alert messages initiated by an alerting authority and broadcast by an alerting disseminator, wherein the radio receiver is normally inactive and unable to receive the emergency alert messages when the vehicle is in the dormant state, the method comprising the steps of:
detecting the dormant state of the vehicle, wherein the dormant state excludes an Accessory state and an ON state of the vehicle;
tracking the user during a time that the vehicle is in the dormant state to detect whether the user remains in the vehicle or is within a predetermined distance of the vehicle;
activating the radio receiver to receive the emergency alert messages during the dormant state when the user remains in the vehicle or is within the predetermined distance of the vehicle;
detecting existence of a relevant emergency alert message; and
initiating an annunciation signal generated in the vehicle and perceptible to the user to inform the user that the relevant emergency alert message is available.

12. The method of claim 11 wherein the step of tracking the user is comprised of detecting whether the user occupies a seat in the vehicle.

13. The method of claim 11 further comprising the step of detecting a location of the vehicle while tracking the user outside the vehicle, wherein the step of activating the radio receiver is performed only when the vehicle location does not correspond to a predetermined ordinary location of the vehicle.

14. The method of claim 13 wherein the predetermined ordinary location comprised a home location or a work location.

15. The method of claim 11 further comprising the step of detecting an open state of a vehicle body closure, wherein the radio receiver is activated during the dormant state when the open state is detected.

16. The method of claim 11 wherein the vehicle includes a wireless transceiver configured to communicate with a handheld wireless device of the user, and wherein the annunciation signal is comprised of an advisory message transmitted from the wireless transceiver to the handheld wireless device.

17. The method of claim 16 wherein the wireless transceiver utilizes short-range network communication, and wherein the step of tracking the user is comprised of detecting a network link between the wireless transceiver and the handheld wireless device.

18. The method of claim 11 wherein the vehicle includes a horn coupled to the controller and an exterior light coupled to the controller, and wherein the annunciation signal is comprised of an acoustic alert from the horn and a visible alert from the exterior light.

19. The method of claim 11 wherein the vehicle includes a display panel coupled to the controller and to the radio receiver, and wherein the method further comprises the steps of:
detecting a return of the user in response to the annunciation signal; and
activating the display panel to display information from the relevant emergency alert message when the return is detected.

20. The method of claim 11 wherein the vehicle includes an ignition switch generating an ignition signal for designating an OFF mode to enter the dormant state.

\* \* \* \* \*